United States Patent [19]
Nemeth et al.

[11] Patent Number: 4,887,795
[45] Date of Patent: Dec. 19, 1989

[54] OPEN-CELLED, ELECTRICALLY CONDUCTIVE CERAMIC NETWORK

[75] Inventors: Joseph Nemeth, Harsens Island; Charles I. Kowalski, Mount Clemens, both of Mich.

[73] Assignee: Champion Spark Plug Company, Toledo, Ohio

[21] Appl. No.: 867,895

[22] Filed: May 20, 1986

Related U.S. Application Data

[63] Continuation of Ser. No. 455,416, Jan. 3, 1983, abandoned.

[51] Int. Cl.$^4$ .............................................. H01B 1/06
[52] U.S. Cl. .................................. 252/511; 252/506; 252/508; 521/920; 524/414; 524/588
[58] Field of Search .............. 252/518, 508, 506, 509, 252/511; 428/312.6, 312.8, 319.3, 325, 327, 304.4; 315/58; 338/20; 524/414, 495, 496, 588; 521/919, 920

[56] References Cited

U.S. PATENT DOCUMENTS

| | | | |
|---|---|---|---|
| 3,046,328 | 7/1962 | Schurecht | 174/152 |
| 3,247,132 | 4/1966 | Schurecht | 252/514 |
| 4,040,998 | 8/1977 | Nemth | 260/29.2 |
| 4,083,905 | 4/1978 | Insley et al. | 264/44 |
| 4,431,575 | 2/1984 | Fagie et al. | 252/511 |
| 4,433,098 | 2/1984 | Nemeth | 252/511 |

Primary Examiner—Josephine Barr
Attorney, Agent, or Firm—John C. Purdue

[57] ABSTRACT

Electrically semi-conducting and conducting open celled ceramic networks and methods for producing them are disclosed. The ceramic network is formed by impregnating an organic foam material with a semi-conducting or conducting ceramic composition, and firing the impregnated material to burn out the foam and to vitrify the ceramic. The semi-conducting or conducting ceramic composition may comprise, on a solids basis, from 45 to 80 percent of a lead-free ceramic frit, from 5 to 15 percent of mono aluminum phosphate, from 6 to 45 percent of a silicone resin, from 0.2 to 13.2 percent of a conducting carbon compound, and an organic solvent or water in an amount sufficient to form a dispersion having a viscosity ranging from 300 to 3000 centipoises, and, in the latter case, from 0.5 to 7 percent of a detergent. The electrically semi-conducting or conducting ceramic composition may also comprise, on a solids basis, a modified copper and alumina composition, from 6 to 45 percent of a silicone resin, and an organic solvent or water and detergent to produce a dispersion having a viscosity ranging from 300 to 3000 centipoises. The organic solvent systems and the aqueous systems both constitute dispersions.

1 Claim, No Drawings

OPEN-CELLED, ELECTRICALLY CONDUCTIVE CERAMIC NETWORK

This application is a cont. of Ser. No. 0/455,416 filed Jan. 3, 1983 now abandoned.

BACKGROUND OF THE INVENTION

1. Field of the Invention

The instant invention relates to open celled electrically semi-conducting and conducting ceramic networks and methods for their production. An open celled, electrically semi-conducting ceramic network of the instant invention is useful in a variety of applications, for example: (1) as a plate of an electrostatic precipitator, particularly useful because it can be operated in a corrosive environment, (2) as an electrically energized mixer and preheater for gases and liquids, (3) as an electrical resistor, and (4) as a particulate trap in the exhaust system of a diesel engine.

2. Description of the Prior Art

Open celled ceramics, their use as catalyst supports, and methods for producing them, are disclosed in U.S. Pat. No. 4,083,905. The reference discloses fabrication of the ceramic supports by flocking an organic sponge with wood or textile fibers, impregnating the flocked sponge with an organic solvent dispersion containing alumina, a silicone resin and a flux, and sintering the impregnated organic sponge at a high temperature to vitrify the ceramic and burn out the sponge.

U.S. Pat. No. 4,040,998 discloses an improvement on the invention of the above-described patent. The improvement involves the use of a suitable detergent to enable the production of an aqueous dispersion of the alumina, silicone resin and flux. The open celled ceramic networks disclosed in both of these references are non-conducting, electrically.

U.S. Pat. Nos. 3,046,328 and 3,247,132 both disclose electrically conducting glass seals which expand during firing and, therefore, are porous. However, the seals are confined during firing so that they form a closed cell structure which is an effective gas seal.

DEFINITION

The terms "percent" and "parts", as used herein and in the appended claims, refer to percent and parts by weight, unless otherwise indicated.

SUMMARY OF THE INVENTION

The instant invention is based upon the discovery of electrically semi-conducting and conducting open celled ceramic networks. The ceramic network is formed by impregnating an organic foam material with a semi-conducting or conducting ceramic composition, and firing the impregnated material to burn out the foam and to vitrify the ceramic. The semi-conducting or conducting ceramic composition may comprise, on a solids basis, from 45 to 80 percent of a lead-free ceramic frit, from 5 to 15 percent of mono aluminum phosphate, from 6 to 45 percent of a silicone resin, from 0.2 to 13.2 percent of a conducting carbon compound, and an organic solvent or water in an amount sufficient to form a dispersion having a viscosity ranging from 300 to 3000 centipoises, and, in the latter case, from 0.5 to 7 percent of a detergent. The electrically semi-conducting or conducting ceramic composition may also comprise, on a solids basis, a modified copper and alumina composition, from 6 to 45 percent of a silicone resin, and an organic solvent or water and detergent to produce a dispersion having a viscosity ranging from 300 to 3000 centipoises. The organic solvent systems and the aqueous systems both constitute dispersions.

DESCRIPTION OF THE PREFERRED EMBODIMENTS

Samples of semi-conductive and conductive open celled ceramic bodies were prepared according to the following procedures.

EXAMPLE I

An organic solvent dispersion was prepared from 48.3 parts of a phenyl lower alkyl silicone resin (commercially available under the designation "DC-840 Resin"), an aqueous solution, 50 percent solids, containing 8.9 parts of mono aluminum phosphate, 40.9 parts of a lead free ceramic frit, 2.9 parts of conductive carbon consisting essentially of 50 percent of a calcined lampblack (commercially available under the designation "Excelsior Lampblack-Electric Calcined) and 50 percent of graphite (commercially available under the designation "Superior Superflake Graphite No. 3735"), and toluene, as required. The lead-free ceramic frit was composed of 2.8 percent of $Al_2O_3$, 21.4 percent of $SiO_2$, 25.9 percent of $B_2O_3$, 11.6 percent of $Na_2O$, 4.4 percent of $CaO$, 1.3 percent of $Li_2O$ and 32.6 percent of $ZnO$. The raw materials were placed in a large mortar and mixed with a pestle; toluene was added to adjust the viscosity of the dispersion to about 1500 centipoises.

Several samples of urethane sponge, each approximately 1 inch in diameter by ½ inch in length, and containing 20 pores per linear inch, were coated with a plastic adhesive dissolved in a toluene-methyl ethyl ketone solvent. The coated sponges were then flocked by applying wood flour thereto. The wood flour was in a fluidized bed; the coated sponge samples were introduced into the fluidized bed. The flocked sponges were immersed in the dispersion, described above, squeezed and released until they were thoroughly impregnated, and removed from the dispersion. The excess dispersion was removed from the impregnated sponges which were then dried at 380 degress F. for 2 hours. After drying, the ends of the impregnated sponges were coated with silver paint which is available under the designation Dupont 4398 to provide electrical contacts. The impregnated sponges were then sintered at 1080 degrees F. for about 15 minutes. The sintering step burned out the urethane sponge and vitrified the lead-free dispersion. After firing, the resistance, in ohms, of three pieces of vitrified ceramic was measured. The resistivity $\rho$, of each piece of the vitrified ceramic, was then calculated from Equation I:

$$\rho = (RA/L)$$

where
  R = the resistance, in ohms, of a body,
  A = the cross-sectional area in $inch^2$, of the body, and
  L = the length of the body in inches. The average resistivity of the three pieces of vitrified ceramic was $2.90 \times 10^5$ ohms-inch.

The vitrified ceramic produced as described above was conductive, but structurally weak. It was strengthened significantly by applying thereto a coating of varnish (commercially available from Dow Corning under the designation "997") and drying the varnish at a temperature of 250 degrees F., and then firing the coated ceramic at 450 degrees F. for approximately 3 hours.

EXAMPLES II–XI

Additional open-celled ceramic bodies were prepared generally in accordance with the procedure and from the materials set forth in Example I. The amounts of the silicone resin, of the $AlPO_4$, of the lead-free ceramic frit, and of the conducting carbon are reported in Table I, as are the pores per linear inch (ppi) of the organic sponges which were impregnated and the average resistivity of three bodies produced in accordance with each Example.

TABLE I

| Example | Composition in parts | | | | Sponge porosity (ppi) | Resistivity (ohms-inch) |
|---|---|---|---|---|---|---|
| | Frit | $AlPO_4$ | Silicone Resin | Carbon | | |
| II | 40.9 | 8.9 | 48.3 | 2.9 | 30 | $4.00 \times 10^4$ |
| III | 40.9 | 8.9 | 48.3 | 2.9 | 45* | $1.68 \times 10^7$ |
| IV | 39.0 | 8.5 | 46.0 | 6.5 | 20 | $1.16 \times 10^3$ |
| V | 39.0 | 8.5 | 46.0 | 6.5 | 30 | $7.00 \times 10^2$ |
| VI | 39.0 | 8.5 | 46.0 | 6.5 | 45* | $1.67 \times 10^3$ |
| VII | 37.5 | 8.2 | 44.3 | 10.0 | 30 | $4.10 \times 10$ |
| VIII | 37.5 | 8.2 | 44.3 | 10.0 | 45* | $1.23 \times 10^2$ |
| IX | 36.2 | 7.9 | 42.8 | 13.2 | 20 | $2.85 \times 10^3$ |
| X | 36.2 | 7.9 | 42.8 | 13.2 | 30 | $1.13 \times 10^2$ |
| XI | 36.2 | 7.9 | 42.8 | 13.2 | 45* | $1.77 \times 10^3$ |

*sponges were not flocked

The data in Table I show that, regardless of the porosity of the sponge used, the resistivity of the bodies decreased as carbon content increased up to about 10 percent. The resistivities of the Example X and XI bodies (13.2 percent carbon) were higher, however, than the resistivities of the Example VII and VIII bodies (10.0 percent carbon). The Example X and XI bodies were more friable than the other bodies, apparently because of their high cabon content. Accordingly, their carbon content of 13.2 percent is near the upper limit on carbon content in a dispersion according to the instant invention.

EXAMPLE XII

An aqueous dispersion which had a viscosity of about 1500 centipoises was prepared by mixing 13.8 parts of the silicone resin described in Example I, 86.2 parts of a resistor composition and 43 parts of an aqueous solution containing 4.5 percent of a detergent. The resistor composition comprised 16.4 percent of $Al_2O_3$, 52.7 percent of $Cu_2O$, 28.5 percent of $SrCO_3$ as a modifier and 2.4 percent of binding clays. The detergent was of the type disclosed in U.S. Pat. No. 2,586,496, a product of the acylation of an alkylol amine.

Several samples of urethane sponge, each approximately 1 inch in diameter by ½ inch in length, and having 20 pores per linear inch, were coated and flocked as described in Example I. The flocked sponges were immersed in the above-described dispersion and thoroughly impregnated therewith. The sponges were removed from the dispersion and the excess dispersion was removed from the sponges. The impregnated sponges were dried at 380 degrees F. for 2 hours and then fired at 2000 degrees F. for about 15 minutes. The firing step burned out the sponge and vitrified the ceramic resistor material. A coating of air drying silver paint was applied to the ends of the vitrified ceramic bodies to provide electrical contacts. The average resistivity of six pieces of the vitrified ceramic resistor was $2.25 \times 10^6$ ohms-inch.

It will be appreciated that the foregoing resistor composition (Example XII) is one disclosed in U.S. Pat. No. 3,959,184, and, therefore, that a carbonate of a metal selected from the group consisting of magnesium, calcium and barium can be substituted for the $SrCO_3$ modifier in the Example XII dispersion. Similarly, the proportions of the modifier M, and of alumina are preferably such that the atom ratio of M to Al is from about 0.5:1 to 2.0:1. The proportions of the copper oxide, alumina and modifier are preferably such that the numerical value of the atom ratio $Cu/(Al+M)$ is from about 0.5 to 4.0. The temperature coefficient of resistance of the vitrified ceramic resistor is preferably between about $-0.1\%$/degree C. and $-1.0\%$/degree C.

The detergent described in Example XII was required to enable suspension of the constituents in the aqueous system. The aqueous solution containinng the detergent could have been replaced with the amount of an organic solvent required to produce a dispersion in the organic solvent having a viscosity of about 1500 centipoises. The aqueous dispersion is preferred, however, because better impregnation of a urethane sponge can be achieved therewith than with an organic solvent dispersion. In addition, an aqueous dispersion is less volatile and safer than is an organic solvent dispersion, especially when a sponge impregnated therewith is subjected to a high temperature sintering operation.

EXAMPLES XIII–XV

A dispersion was prepared by mixing 39 parts of a ceramic frit, 8.5 parts of mono aluminum phosphate, 46.0 parts of the silicone resin described in Example I and 6.5 parts of the conductive carbon described in Example I. The ceramic frit consisted of 19.9 percent of $SiO_2$, 14.5 percent of $B_2O_3$, 59.2 percent of PbO and 6.4 percent of $Na_2O$. The raw materials were mixed together with a pestle in a large mortar; toluene was added as required to adjust the viscosity of the dispersion to about 1500 ccentipoises.

Several samples of urethane sponge, each approximately 1 inch in diameter by ½ inch in length, some having 20 ppi and others having 30 ppi were coated and flocked as described in Example I. The flocked sponges and several unflocked sponges having about 45 ppi, were immersed, one at a time, in the above-described dispersion and thoroughly impregnated therewith. The sponges were removed from the dispersion and the excess dispersion was removed from the sponges. The impregnated sponges were dried at 380 degrees F. for about 2 hours and a coating of conducting silver paint was applied to the ends thereof. The dried impregnated sponges were fired at 1080 degrees F. for about 15 minutes to burn out the sponge and vitrify the ceramic. The average resistivities of three vitrified ceramic pieces made in accordance with each of Examples XIII–XV are reported in Table II.

TABLE II

| EXAMPLE | Porosity of sponge (ppi) | Resistivity ohms-inch |
|---|---|---|
| XIII | 20 | $2.1 \times 10^4$ |
| XIV | 30 | $1.6 \times 10^3$ |
| XV | 45* | $6.0 \times 10^2$ |

*sponges were not flocked.

Examples XVI and XVII set forth other modes contemplated by the inventors.

EXAMPLE XVI

An aqueous dispersion is prepared by mixing 27.8 parts of the silicone resin described in Example I, 7.4 parts mono aluminum phosphate, 67.6 parts of the lead-free ceramic frit described in Example I, 10.1 parts of the conductive carbon described in Example I and 43 parts of an aqueous solution containing 4.5 percent detergent. The ingredients are mixed substantially according to the procedure described in Example I, with the exception that the aqueous solution is added after the dispersion achieves a smooth consistency. The viscosity of the dispersion is adjusted, by adding water, to approximately 1500 centipoises.

A sample of urethane sponge, approximately 1 inch in diameter by ½ inch in length and containing 30 pores per linear inch, is coated and flocked as in Example I. The flocked sponge is thoroughly impregnated with the above-described dispersion and the excess dispersion is removed therefrom. The impregnated sponge is dried at 380 degrees F. for 2 hours; the ends thereof are coated with Dupont 4398 silver paint; and the impregnated sponge is fired at 1080 degrees F. for about 15 minutes. The firing step burns out the sponge and vitrifies the ceramic material.

EXAMPLE XVII

An aqueous dispersion is prepared by mixing 9.4 parts of the silicone resin described in Example I, 7.4 parts mono aluminum phosphate, 85.3 parts of the lead free ceramic frit described in Example I, 10.1 parts of the conductive carbon described in Example I and 43 parts of an aqueous solution containing 4.5 percent detergent. The ingredients are mixed substantially according to the procedure described in Example I, with the exception that the aqueous solution is added after the dispersion achieves a smooth consistency. The viscosity of the dispersion is adjusted, by adding water, to approximately 1500 centipoises.

A sample of urethane sponge, approximately 1 inch in diameter by ½ inch in length and containing 30 pores per linear inch, is coated and flocked as in Example I. The flocked sponge is thoroughly impregnated with the above-described dispersion and the excess dispersion is removed therefrom. The impregnated sponge is dried at 380 degrees F. for 2 hours; the ends thereof are coated with Dupont 4398 silver paint; and the impregnated sponge is fired at 1080 degrees F. for about 15 minutes. The firing step burns out the sponge and vitrifies the ceramic material.

Any organic sponge capable of being impregnated with the ceramic dispersion can be used in practicing the instant invention; commercially available examples including open-celled cellulose and polyurethane foam sponges. Preferably, the sponge has a substantially uniform open-celled structure to enable uniform "pick-up" of the ceramic material. Polyurethane foam is available in a large variety of open-celled sizes. Sponges having between approximately 15 and 50 pores per linear inch have been found to produce excellent results when used with the ceramic and resistor materials disclosed herein. The pick-up of the ceramic material by the organic sponge can be easily accomplished by immersing the sponge in the dispersion and alternately compressing and releasing the sponge until the dispersion has been absorbed throughout the sponge material. For example, a suitable urethane sponge material is available from Scott Paper Company under the trade designation "Scott Q-Foam". Other suitable urethane sponge materials are also available from the Scott Paper Company under the trade designations "Thirsty Foam", and "Z-Foam".

Organic silicone materials which are suitable for use in the instant invention are disclosed in U.S. Pat. Nos. 3,090,691 and 3,108,985. Particularly useful in the instant invention are phenyl lower alkyl silicone resins wherein the total of phenyl and lower alkyl groups divided by the number of silicon atoms is from 0.9 to 1.5. Preferably, the alkyl group has not more than 4 carboon atoms. In particular, the silicone resins available from Dow Corning Corporation under the trade designations "DC-809" and "DC-840" are suitable; these resins as commercially supplied contain approximately 40 percent toluene as a solvent. Other suitable resins for use in the instant invention include, for example, the General Electric resins designated "SR 82", "SR 182" and "SR 323".

The structural strength of an open celled conductive ceramic network of the instant invention, as previously indicated, can be increased by applying a varnish to the surface thereof, It will be appreciated that any coating which imparts structural strength to the ceramic is suitable for this purpose. For example, a du Pont 5137 resistor encapsulating material has been found to strengthen the ceramic network of the instant invention. The du Pont material can be applied to the vitrified ceramic, dried at 250 degrees F. and fired at about 950 degrees F. for five minutes.

Examples of lead free ceramic frits, in addition to that which is described in Example I, which can be used in practicing the instant invention, have compositions which fall within the limits indicated below for one of Compositions A, B, and C.

| Constituent | Composition A | B | C |
| --- | --- | --- | --- |
| $Al_2O_3$ | 0–5 | | 21 |
| $SiO_2$ | 25–45 | 30 | |
| $B_2O_3$ | 17–25 | 5 | 7 |
| $Na_2O$ | 10–25 | 10 | 21 |
| $K_2O$ | 0–2 | 10 | |
| $CaO$ | 2–10 | | |
| $BaO$ | 5–20 | | |
| $LiO_2$ | 2–5 | 10 | 3 |
| $MgO$ | 0–2 | | |
| $TiO_2$ | 0–2 | 30 | |
| $MoO_3$ | 0–2 | | |
| F | 0–4 | | 4 |
| $P_2O_5$ | | 2 | 44 |
| $Fe_2O_3$ | | 3 | |

Determinations were made of what volume percent of several of the bodies produced as described in the foregoing Examples, constituted ceramic material. The overall dimensions of the bodies were measured; the overall volume of each body was calculated. Each body was then immersed in water, and the volume of water it displaced was measured. The volume percent of ceramic material in each body was calculated by dividing the volume of displaced water by the overall volume of each body and multiplying the quotient by 100. The average volume percent of ceramic material in several bodies produced from sponges having 45 ppi was 29 percent. The average volume percent of ceramic material in several bodies produced from sponges having 20 ppi was 15.5 percent.

Different voltages were applied to the open-celled ceramic bodies produced as described in Examples IV, VII, VIII and X, initial resistances of 1520, 38, 137 and 175 ohms, respectively, and temperature was determined as a function of applied voltage. A thermocouple placed in contact with each body was used to measure the equilibrium temperature of the bodies at several different applied voltages. The test data for each body are reported in Table III.

TABLE III

| Applied Voltage | Temperature (degrees F) | | | |
|---|---|---|---|---|
| | Ex. IV | Ex. VII | Ex. VIII | Ex. X |
| 10 | 80 | 93 | 84 | 94 |
| 20 | 90 | 135 | 100 | 110 |
| 30 | 95 | 235 | 133 | 155 |
| 35 | — | 320 | — | — |
| 40 | — | 380 | 180 | 200 |
| 50 | 103 | — | 240 | 290 |
| 60 | — | — | 320 | 360 |
| 70 | 130 | — | 410 | — |
| 90 | 160 | — | — | — |
| 120 | 230 | — | — | — |

The data in Table III demonstrate that the applied voltages caused current flow and consequent heating in the bodies tested. This characteristic of bodies according to the instant invention makes them useful in a variety of applications where heating is desired. For example, a plurality of gases or liquids can be mixed and heated by passing them through an electrically heated porous ceramic according to the invention, or a single gas or liquid can be so heated. Because of its electric conductivity, a porous ceramic according to the invention can also be used as a plate of an electrostatic precipitator.

The heating characteristic referred to in the foregoing paragraph and the open-celled configuration of a semi-conducting ceramic according to the invention make it a good candidate for use as a particulate trap in the exhaust system of a diesel engine. By comparison with gasoline engines, diesel engines, during operation, emit large amounts of particulate matter which is primarily carbonaceous. It is contemplated to direct diesel engine exhaust gas through open-celled ceramics of the invention thereby trapping the particulate matter therein. When the pores of the ceramic become plugged, the exhaust gas can be diverted around the ceramic. At this point, a voltage can be applied to the ceramic to cause heating thereof. The applied voltage would be sufficient to oxidize the carbonaceous particulate matter thereby unplugging the pores of the ceramic. When the pores are unplugged, the exhaust gases can be redirected through the ceramic.

The bulk density of a vitrified ceramic according to the invention can be increased or decreased by the expedient of increasing or decreasing the viscosity of the dispersion with which a sponge or the like is impregnated. However, this expedient has limits because of problems which arise with clogging of the pores of the sponge or because the fired ceramic is excessively weak. The bulk density can also be increased by flocking the sponge as described above, but with textile fibers such as cotton or rayon. The adhesive used for flocking should provide a tacky surface and should remain sufficiently resilient that it does not interfere with impregnation of the flocked sponge with the ceramic dispersion; an adhesive such as a polyurethane coating composition has the above described characteristics. The identity of the adhesive is unimportant; it need have only the indicated characteristics. The flocking can be accomplished by conventional methods such as spraying the fibers onto the tacky surface. However, the use of a fluidized bed is preferred since it enables uniform distribution of the fibers throughout the urethane sponge, thereby increasing the surface area and strength of the vitrified ceramic.

While several embodiments of the instant invention have been described in the foregoing examples, various changes and modifications thereof can be made without departing from the spirit and scope of the invention as defined in the following claims.

What we claim is:

1. An article comprising, in combination, means forming a body of a vitrified ceramic material having interconnected voids distributed therethrough which are effective to make it pervious, and means operatively associated therewith and effective to impart thereto a resistivity of from $4\times10^1$ to $4\times10^7$ ohms-inch without imparting excessive friability thereto, said ceramic material constituting from 15 percent to 30 percent by volume of said body and the voids constituting the remainder of the volume thereof.

* * * * *